(12) United States Patent
Boss et al.

(10) Patent No.: US 9,253,433 B2
(45) Date of Patent: Feb. 2, 2016

(54) METHOD AND APPARATUS FOR TAGGING MEDIA WITH IDENTITY OF CREATOR OR SCENE

(71) Applicant: International Business Machines Corporation, Armonk, NY (US)

(72) Inventors: Gregory J. Boss, Saginaw, MI (US); James R. Kozloski, New Fairfield, CT (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/686,433

(22) Filed: Nov. 27, 2012

(65) Prior Publication Data

US 2014/0146204 A1    May 29, 2014

(51) Int. Cl.

| H04N 5/77 | (2006.01) |
|---|---|
| H04N 5/232 | (2006.01) |
| H04M 1/02 | (2006.01) |
| H04N 9/82 | (2006.01) |
| H04N 5/262 | (2006.01) |
| H04N 5/272 | (2006.01) |

(52) U.S. Cl.
CPC ............. *H04N 5/772* (2013.01); *H04M 1/0264* (2013.01); *H04N 5/23229* (2013.01); *H04N 5/2621* (2013.01); *H04N 5/272* (2013.01); *H04N 9/8205* (2013.01)

(58) Field of Classification Search
USPC .......................................................... 348/47
See application file for complete search history.

(56) References Cited

U.S. PATENT DOCUMENTS

| 5,530,759 | A | 6/1996 | Braudaway et al. |
|---|---|---|---|
| 6,111,517 | A * | 8/2000 | Atick et al. .................. 340/5.83 |
| 6,930,707 | B2 | 8/2005 | Bates et al. |
| 6,963,363 | B1 | 11/2005 | Ohmura |
| 7,466,348 | B2 | 12/2008 | Morikawa et al. |
| 2003/0156304 | A1* | 8/2003 | Fedorovskaya et al. ...... 358/527 |
| 2003/0210808 | A1* | 11/2003 | Chen et al. .................... 382/118 |
| 2003/0231769 | A1 | 12/2003 | Bolle et al. |

(Continued)

FOREIGN PATENT DOCUMENTS

WO         WO 00/36605        6/2000

OTHER PUBLICATIONS

International Search Report and Written Opinion dated Apr. 14, 2014 for International Application No. PCT/US2013/071710.

(Continued)

*Primary Examiner* — Sinh Tran
*Assistant Examiner* — Mark Monk
(74) *Attorney, Agent, or Firm* — Fleit Gibbons Gutman Bongini & Bianco PL; Jose Gutman

(57) ABSTRACT

An electronic device and method for contemporaneously obtaining, with a processor connected to a memory, a forward image from a forward facing camera of the electronic device and a rear image from a rear facing camera of the electronic device, and embedding the rear image in the forward image or the forward image in the rear image, thereby creating a composite image. Optionally, the rear image is embedded as a watermark in the forward image thereby creating the composite image. Alternatively, the rear image is steganographically embedded in the forward image thereby creating the composite image.

12 Claims, 6 Drawing Sheets

(56) References Cited

U.S. PATENT DOCUMENTS

| | | |
|---|---|---|
| 2004/0158724 A1 | 8/2004 | Carr et al. |
| 2005/0036044 A1* | 2/2005 | Funakura ............... 348/239 |
| 2005/0054926 A1* | 3/2005 | Lincoln ............... 600/443 |
| 2006/0045308 A1 | 3/2006 | Abrams et al. |
| 2006/0176516 A1 | 8/2006 | Rothschild |
| 2006/0272031 A1 | 11/2006 | Ache et al. |
| 2007/0159535 A1 | 7/2007 | Kumagai et al. |
| 2009/0002491 A1 | 1/2009 | Haler |
| 2009/0129672 A1 | 5/2009 | Camp, Jr. et al. |
| 2010/0118175 A1 | 5/2010 | Bruce |
| 2010/0231753 A1* | 9/2010 | Hagiwara ............... 348/231.6 |
| 2010/0281545 A1* | 11/2010 | Levy ............... 726/30 |
| 2011/0002543 A1* | 1/2011 | Almodovar Herraiz et al. ............... 382/190 |
| 2011/0085015 A1 | 4/2011 | Jun et al. |
| 2011/0199294 A1 | 8/2011 | Vilcovsky |
| 2011/0202531 A1 | 8/2011 | Zuckerberg et al. |
| 2012/0120186 A1* | 5/2012 | Diaz et al. ............... 348/36 |
| 2012/0154633 A1 | 6/2012 | Rodriguez |

OTHER PUBLICATIONS

Mohanty, S.P., et al., "VLSI Architecture of an Invisible Watermarking Unit for a Biometric-Based Security System in a Digital Camera," 1-4244-0763-X/07, copyright 2007 IEEE.

Blythe, P., et al., "Secure Digital Camera," In Proceedings of Digital Forensic Research Workshop (DFRWS), 2004.

Non Final Office Action dated Sep. 11, 2014 received for U.S. Appl. No. 14/030,309.

Final Office Action dated Feb. 24, 2015 received for U.S. Appl. No. 14/030,309.

Non-Final Office Action dated Jun. 2, 2015, for U.S. Appl. No. 14/030,309.

\* cited by examiner

METHOD AND APPARATUS FOR TAGGING MEDIA WITH IDENTITY OF CREATOR OR SCENE

BACKGROUND

The present invention generally relates to electronic devices including at least one camera, and to the electronic devices performing image processing, and more particularly relates to an electronic device processing images where the electronic device, with at least one camera, obtains and processes a forward image and a rear image.

Smartphones often have two cameras, pointed in opposite directions. The first smartphones mainly combined the functions of a personal digital assistant (PDA) and a mobile phone or camera phone. Today's models also serve to combine the functions of portable media players, low-end compact digital cameras, pocket video cameras, and global positioning system (GPS) navigation units. Modern smartphones typically also include high-resolution touchscreens, web browsers that can access and properly display standard web pages rather than just mobile-optimized sites, and high-speed data access via Wi-Fi and mobile broadband. With such integration of functions, untold numbers of capabilities and functions are now within reach of development and implementation.

BRIEF SUMMARY

In one embodiment, a method with an electronic device is disclosed. The method includes contemporaneously obtaining, with the electronic device having a processor coupled to memory, a forward image from a forward facing camera of the electronic device and a rear image from a rear facing camera of the electronic device. Optionally, contemporaneously obtaining is in response to a single trigger (e.g., single triggering event). The method further includes embedding the rear image in the forward image or the forward image in the rear image thereby creating a composite image.

In another embodiment, a portable electronic device includes a forward facing camera, a rear facing camera, a memory storing computer instructions, and a processor communicatively coupled to the memory, the forward facing camera, and the rear facing camera where the processor, responsive to executing the computer instructions, performs operations. The operations can include contemporaneously obtaining a forward image from the forward facing camera and a rear image from the rear facing camera and embedding the rear image in the forward image or embedding the forward image in the rear image, thereby creating a composite image.

In yet another embodiment, a computer readable storage medium, including computer instructions which, responsive to being executed by a processor, cause the processor to perform operations comprising contemporaneously obtaining a forward image from a forward facing camera and a rear image from a rear facing camera of a portable electronic device, and embedding the rear image in the forward image or embedding the forward image in the rear image thereby creating a composite image.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
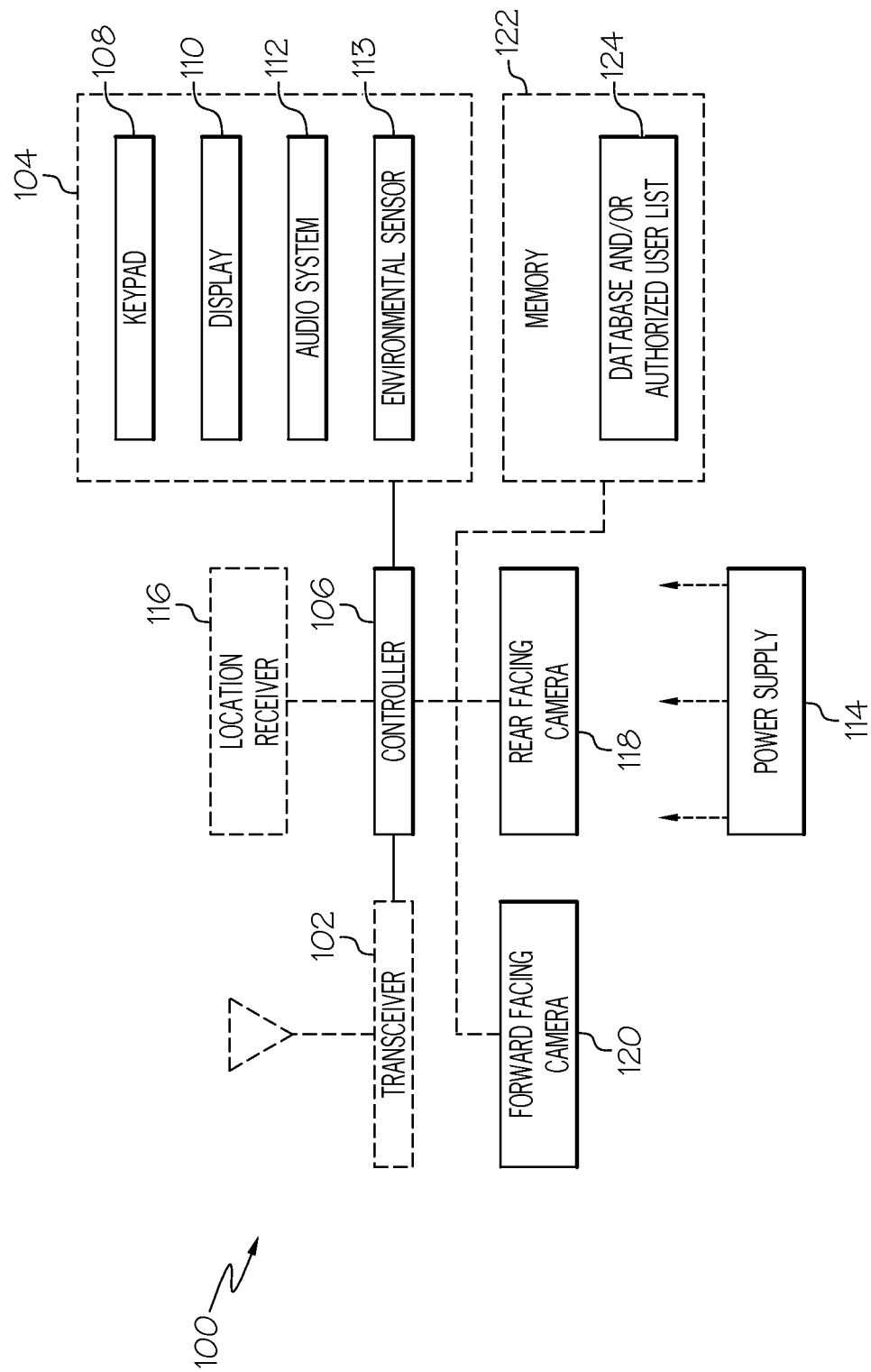
FIG. 1 is a block diagram illustrating one example of a portable electronic device according to one embodiment of the present invention.

FIG. 1 shows one example of an operating environment 100 applicable to various embodiments of the present invention. FIG. 1 depicts an illustrative example of a portable electronic device such as a communication device 100. The communication device 100 can include a wireline and/or wireless transceiver 102 having transmitter and receiver sections (herein transceiver 102), a user interface (UI) 104, a power supply 114, a location receiver 116, a rear facing camera 118, a forward facing camera 120, a memory 122, and a controller 106 for managing operations thereof. The cameras 118 or 120 can include one or more of a charged coupled device (CCD) or other image taking device commonly used in smart phones. The cameras can be facing in opposite directions or can be aligned or oriented differently, but generally, one camera will obtain the image of the photographer and the other camera or cameras obtains a view or scene that can be visible outwardly to the photographer either directly or indirectly through a display or viewfinder. The transceiver 102 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, code division multiple access-1X (CDMA-1X), Universal Mobile Telephone System/High Speed Downlink Packet Access (UMTS/HSDPA), Global System for Mobile/General Packet Radio System (GSM/GPRS), time division multiple access/Enhanced Data GSM Environment (TDMA/EDGE), Evolution Data Optimized (EV/DO), Worldwide Interoperability for Microwave Access (WiMAX), Software Defined Radio (SDR), Long Term Evolution (LTE), as well as other next generation wireless communication technologies as they arise. The transceiver 102 can also be adapted to support circuit-switched wireline access technologies (such as Public Switched Telephone Network (PSTN)), packet-switched wireline access technologies (such as Transmission Control Protocol/Internet Protocol (TCP/IP), Voice over Internet Protocol (VoIP), etc.), and combinations thereof.

The UI 104 can include a depressible, touch-sensitive or virtual keypad 108 with a navigation mechanism such as a roller ball, an optical navigation module (i.e. trackpad), a joystick, a mouse, or a navigation disk for manipulating operations of the communication device 100. The keypad 108 can be an integral part of a housing assembly of the communication device 100 or an independent device operably coupled thereto by a tethered wireline interface (such as a Universal Serial Bus (USB) cable) or a wireless interface supporting, for example, Bluetooth. The keypad 108 can represent a numeric keypad commonly used by phones, and/or a QWERTY keypad with alphanumeric keys. The keypad 108 can also represent a single button or switch that can be used, with a processor, to contemporaneously obtain (e.g., obtain in response to a single trigger that includes detecting actuation of the single button or switch), images from a rear facing camera 118 and a forward facing camera 120 upon activation of the single button or switch (single trigger). The UI 104 can further include a display 110 such as monochrome or color Liquid Crystal Display (LCD), Organic Light Emitting Diode (OLED) or other suitable display technology for conveying images to an end user of the communication device 100. In an embodiment where the display 110 is touch-sensitive, a portion or all of the keypad 108 can be presented by way of the display 110 with navigation features.

The display 110 can use touch screen technology to also serve as a user interface for detecting user input (e.g., touch of a user's finger). As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used control the manipulation of the GUI elements. The display 110 can be an integral part of the housing assembly of the communication device 100 or an independent device communicatively coupled thereto by a tethered wireline interface (such as a cable) or a wireless interface. The display 110 can also alternatively or additionally be a part of a viewfinder for the cameras.

The UI 104 can also include an environmental sensor 113 which can include an accelerometer, a gyroscope, a GPS sensor, an inclinometer, an optical sensor, audio-spectrum sensors, ultrasonic transmitters and sensors, an infrared or other proximity sensor, or another sensor which can detect orientation or motion. The environmental sensor 113 can also include a thermometer, a pressure gauge or other environmental sensor. The UI 104 can further include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The environmental sensor 113 within the UI 104 can also be a charged coupled device (CCD) camera for capturing still or moving images or for just capturing ambient light conditions.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies.

The location receiver 116 can utilize common location technology such as a global positioning system (GPS) receiver capable of assisted GPS for identifying a location of the communication device 100 based on signals generated by a constellation of GPS satellites, which can be used for facilitating location services such as navigation.

Note that the operational environment is not limited to a communication device 100 in accordance to the embodiments. The operational environment can simply be any electronic device having a forward facing camera and a rear facing camera, or the like. The communication device 100 as described herein can operate with more or less of the circuit components shown in FIG. 1, depicted illustratively by the hash lines. These variant embodiments are contemplated as shown and described herein.

For clarification, the term "forward facing camera" as generally used herein refers to a camera facing out and away from a photographer taking a forward facing image or a picture or a scene or view. The term "rear facing camera" as generally used herein refers to a camera facing in and toward a photographer taking a picture of their self. Camera devices generally use this terminology. In some instances, such as with smart phones, the terminology has been reversed where the "forward facing camera" refers to the camera taking a picture of the photographer and the "rear facing camera" refers to the camera taking a picture of the scene or view facing away from the photographer. This disclosure generally uses the first definitions described above, but note that they can be interchangeable and both interpretations are contemplated herein.

Figure 2:
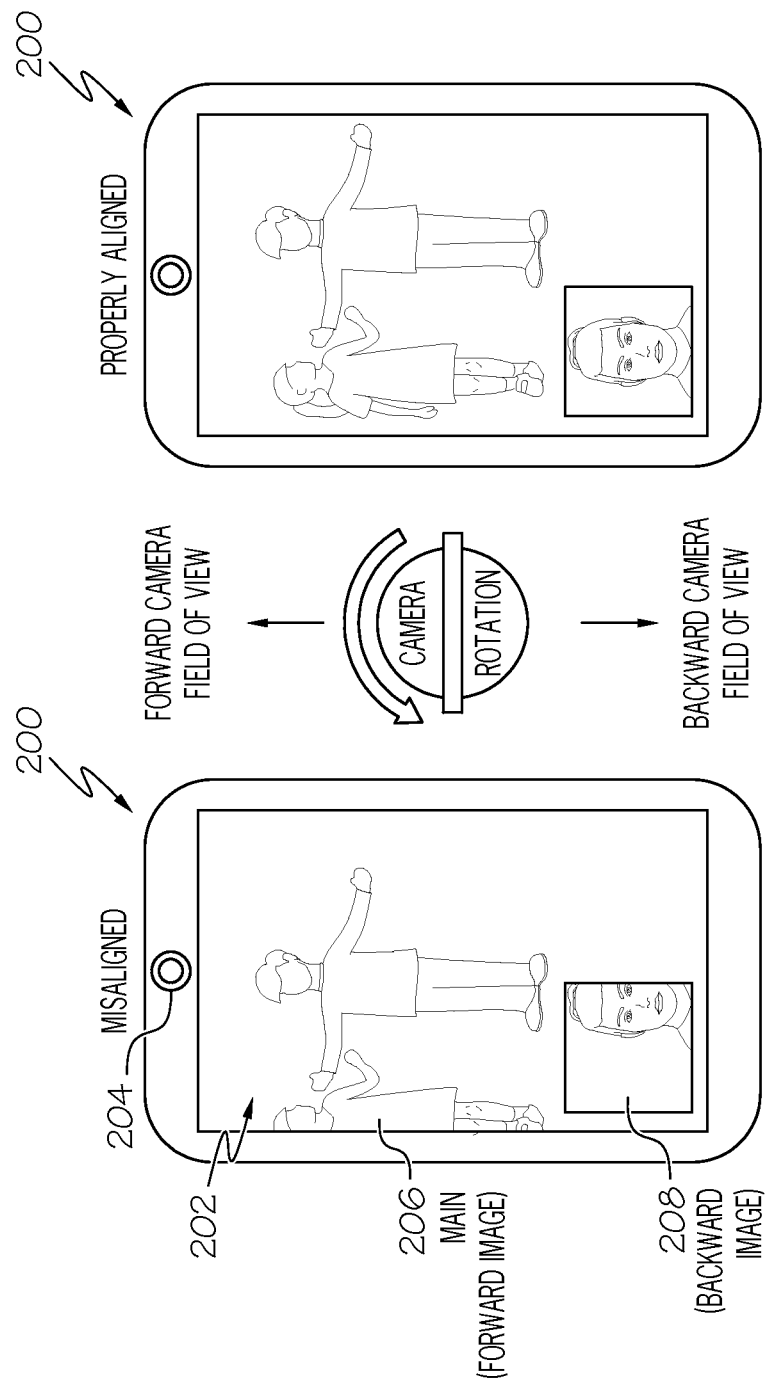
FIG. 2 shows one example of another portable electronic device according to one embodiment of the present invention.

Referring to FIG. 2, a portable electronic device 200 in accordance with the various embodiments includes a rear facing camera 204 and a forward facing camera (not shown). The portable electronic device further includes a display 202 for displaying a composite image which is a combination of a forward facing image 206 and a rear facing image 208. The composite image can be a dual image from the forward facing camera and rear facing camera taken simultaneously or contemporaneously. On a smart phone screen or a camera viewfinder, both images can be composed in the following manner: The forward facing image on full main screen and the rear facing image on main screen picture-in-picture (PIP) where the picture-in-picture is automatically positioned to not interfere or not obstruct with the forward facing image composition. Maintaining both images in an active viewfinder, a user can adjust settings, camera angle, or focus independently for the forward and rear facing image in order to compose the dual image. Automatic lighting compensation, among other adjustments, can also be performed, with a processor, independently on each camera, before the images are taken contemporaneously. For example, the processor automatically can make adjustments to align the forward image and rear image to each other before contemporaneously obtaining the forward image and rear image. Then, the processor, in response to a single trigger event can obtain the forward and rear images. As shown in FIG. 2, the portable electronic device and the corresponding rear facing and forward facing cameras can be properly aligned (and otherwise adjusted) on the display 202 or viewfinder before obtaining the contemporaneous rear facing and forward facing images.

In several embodiments, the forward and rear facing images can be analyzed by image analysis, machine learning, and other automatic algorithms for information regarding the individuals, expressions, and/or objects/scenery present in each image as will be further detailed with the description of FIGS. 4-7. This simultaneous or contemporaneous analysis of both images can then provide a means to identify relationship information about the images. This relationship information, such as the social relationship between individuals in the two images, can then be used in another context, for example in posting and sending alerts or messages to members of both individual's social networks, setting up calendar appointments, facilitating commerce, and the like. Relationship information, when identified, can be more valuable than the information in the images individually, both in terms of user experience, and in other applications such as security and photo management. For security, a forward facing image may be analyzed to determine its content and the rear facing image can be analyzed to determine if the photographer (e.g., a user of the electronic device) is authorized to make the photograph. For photo management, a photographer may be determined to be not the owner of the photograph, based on the analysis of forward facing and rear facing images, and the photograph can then be secured in a location that only an authorized third party (or the subject in the forward facing image) may access.

As will be appreciated by one skilled in the art, aspects of the various examples may be embodied as a system, method, or computer program product. Accordingly, examples herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
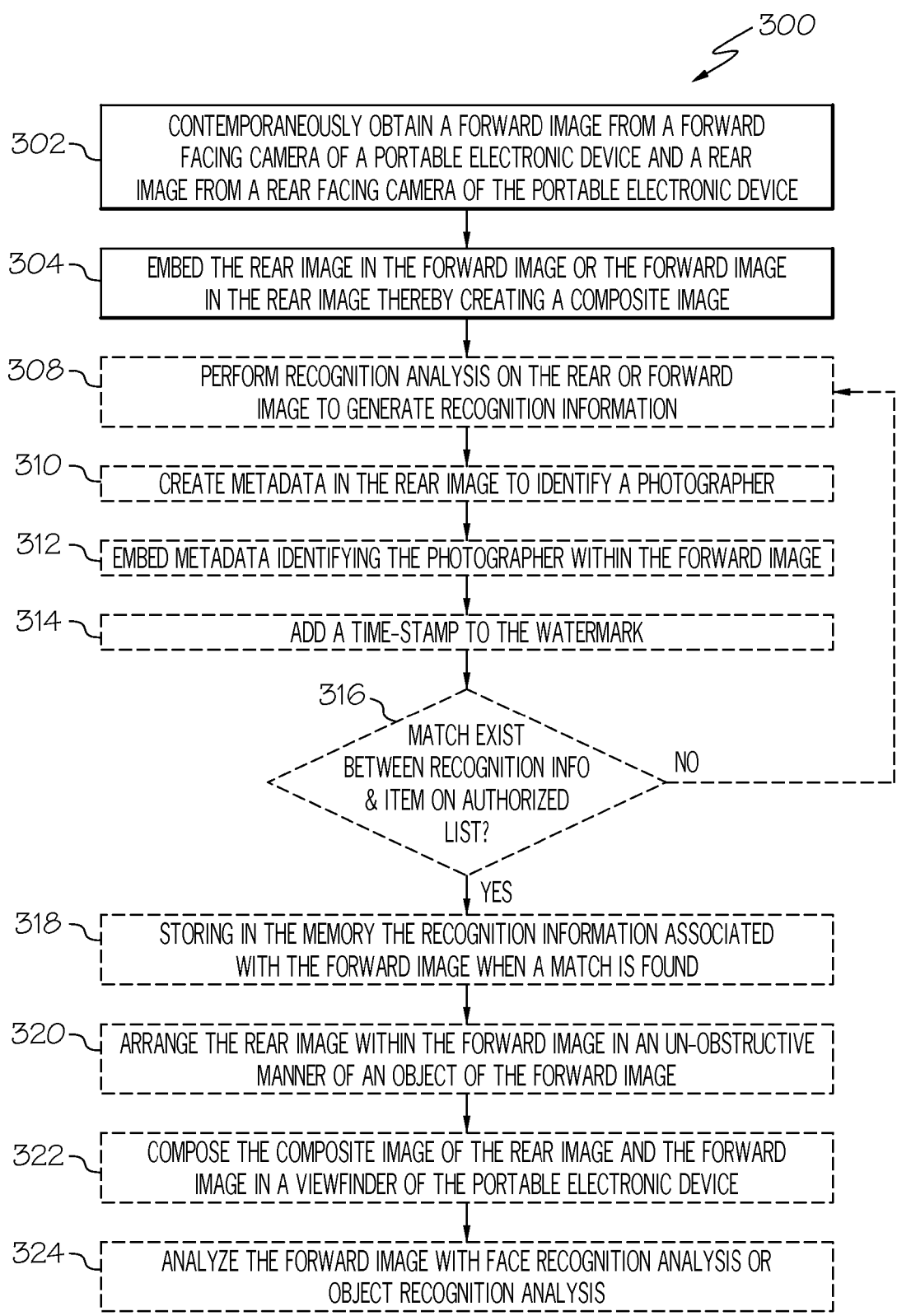
FIG. 3 is an operational flow diagram illustrating various method embodiments according to the present invention.

Referring now to FIG. 3, the flow diagram 300 illustrates the architecture, functionality, and operation of possible implementations of systems, methods, and computer program products according to various embodiments herein. In this regard, each block in the flow diagram 300 may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

FIG. 3 is an operational flow diagram illustrating one example of utilizing forward facing images and rear facing images taken contemporaneously by a portable electronic device such as a communication device. The operational flow diagram 300 of FIG. 3 begins at step 302 by contemporaneously or simultaneously obtaining a forward image from a forward facing camera and a rear facing image from a rear facing camera of an electronic device such as portable communication device. The method then flows to step 304 where the rear facing image is embedded in the forward facing image or alternatively the forward facing image is embedded in the rear facing image (e.g., to create a composite image). The "embedding" can come in many forms. For example, embedding can be a watermark or digital watermark that is either visible or hidden from view. The embedded information can also be steganographic information (secret information) that can be encrypted as well as imperceptible by human vision (e.g. hidden). For example, and not for limitation, secret information derived from the rear image can be steganographically embedded within the composite image. It should be noted that the steps shown in FIG. 3 are not required to be performed in any particular order and one or more steps can be performed in parallel. Further note that many of the steps illustrated can be considered optional as depicted illustratively by the hash lines. These variant embodiments are contemplated as shown and described herein.

One application of watermarking is in copyright protection systems, which are intended to prevent or deter unauthorized copying of digital media. In this use, a copy device retrieves the watermark from the signal before making a copy; the device makes a decision whether to copy or not, depending on the contents of the watermark. Another application is in source tracing. A watermark is embedded into a digital signal at each point of distribution. If a copy of the work is found later, then the watermark may be retrieved from the copy and the source of the distribution is known. This technique reportedly has been used to detect the source of illegally copied movies. Annotation of digital photographs with descriptive information is another application of invisible watermarking. While some file formats for digital media may contain additional information called metadata, digital watermarking is distinctive in that the data is carried right in the signal.

At step 308, the operational flow can further perform recognition analysis on the obtained images such as object or face recognition analysis on the rear or forward facing image to generate recognition information. For example, the rear facing image can be analyzed for expressions to determine tags to apply to the composite image. (See FIG. 7). Alternatively, the forward facing image can be analyzed for expressions if available or can be analyzed in a broader sense to determine appropriate tags for an object or a scene or forward facing view. (See FIGS. 5 and 6). Note that the forward facing image can also be analyzed to recognize objects and not necessarily just faces or expressions. In one embodiment, metadata can be created in association with the rear facing image to identify a photographer at step 310. As discussed above, the identity can be used for security or access purposes and/or for social networking purposes. Identification of individuals in a forward facing image can also be recognized and used for similar purposes. At step 312, in one embodiment, metadata identifying the photographer from the rear facing image can be embedded within the forward facing image. Alternatively, metadata identifying a scene or view within a forward facing image can be embedded within a picture of the photographer from the rear facing image. At step 314, a time stamp can be added to the watermark (see FIG. 7).

At decision block 316, the image or images analyzed and recognized from previous steps can be compared to information stored in a database or an authorized list (e.g., compared to user information stored in an authorized user list) to determine if a match exists. If a match exists, security functions or social networking functions can be pursued. In one embodiment at step 318, the recognition information associated with the forward facing image can be stored in a memory when a match is found or exists between the recognition information and the item (e.g., user information) in the authorized list or database (e.g., authorized user list).

In other embodiments at step 320, the rear facing image can be arranged within the forward facing image in an un-obstructive manner of the object or objects recognized in the forward facing image. At step 322, the portable electronic device can include a viewfinder and a composite image of the rear facing image and the forward facing image can be composed on the viewfinder of the portable electronic device. As noted above, the forward facing image can be analyzed with face recognition analysis or with object recognition analysis or both at step 324.

Figure 4:
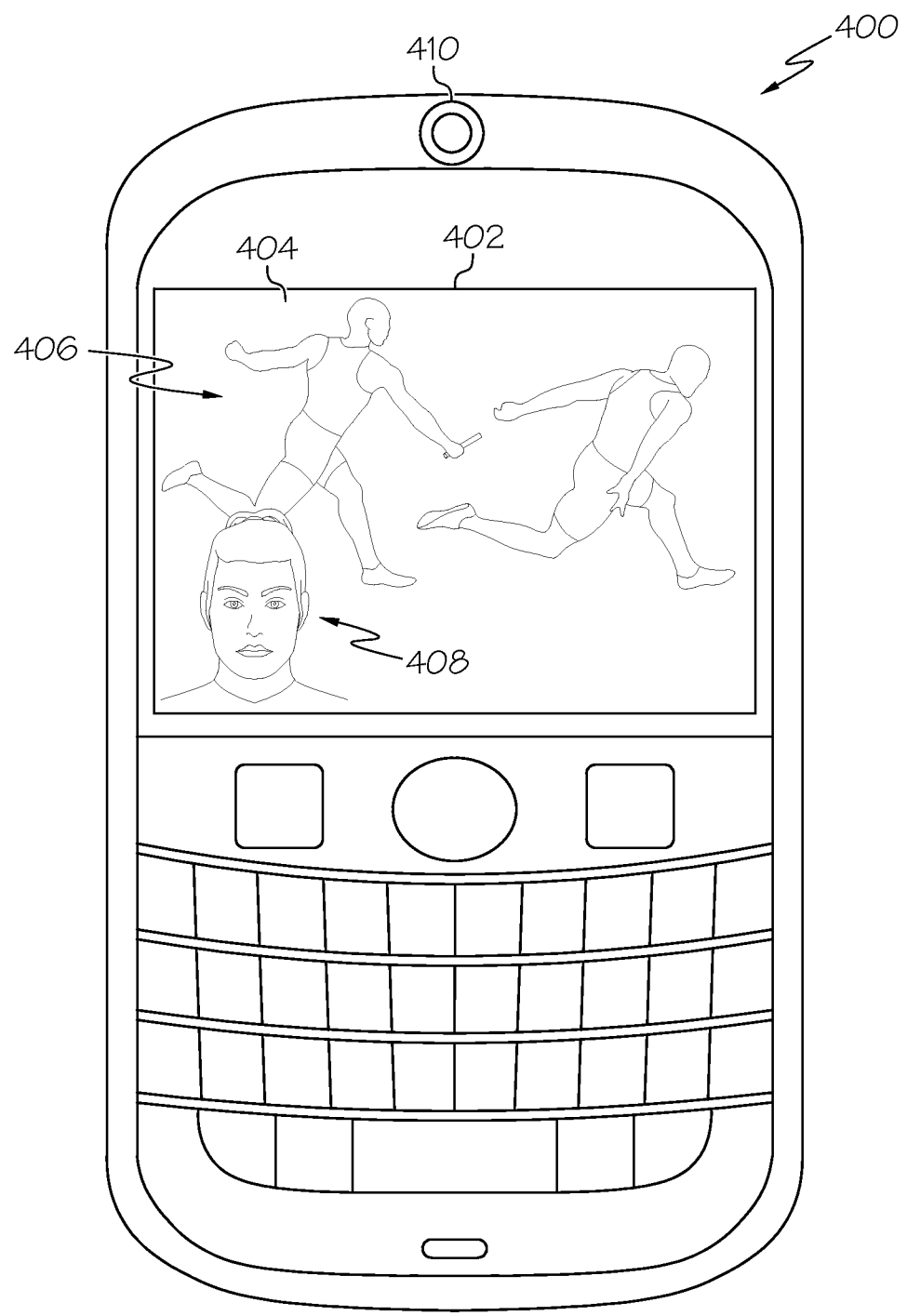
FIGS. 4-7 show various examples of a display associated with a portable electronic device displaying information associated with either a rear facing camera, a front facing camera, or both, according to various embodiments of the present invention.
Figure 5:
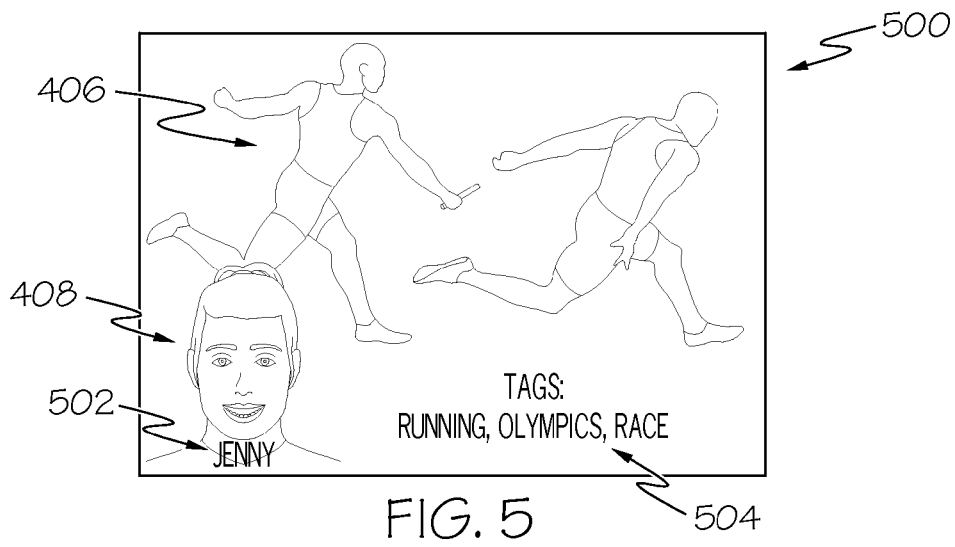
Figure 6:
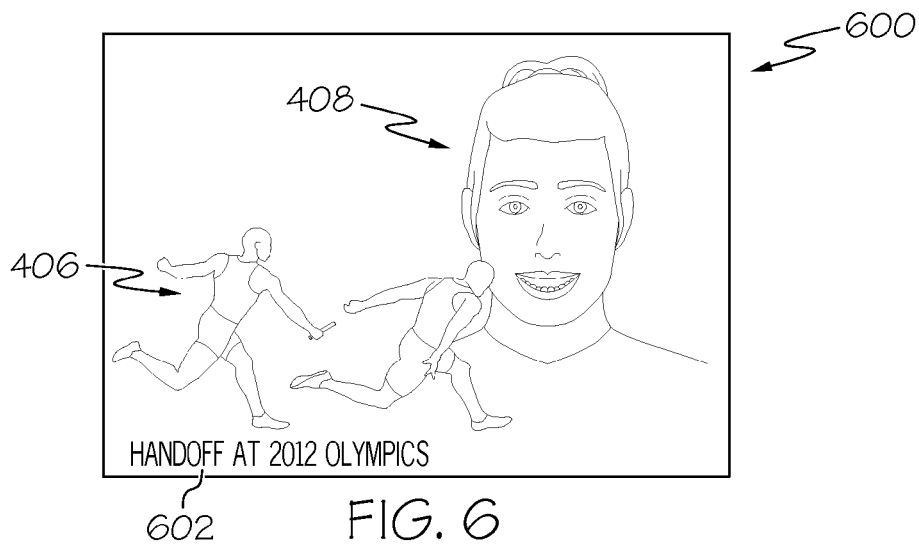
Figure 7:
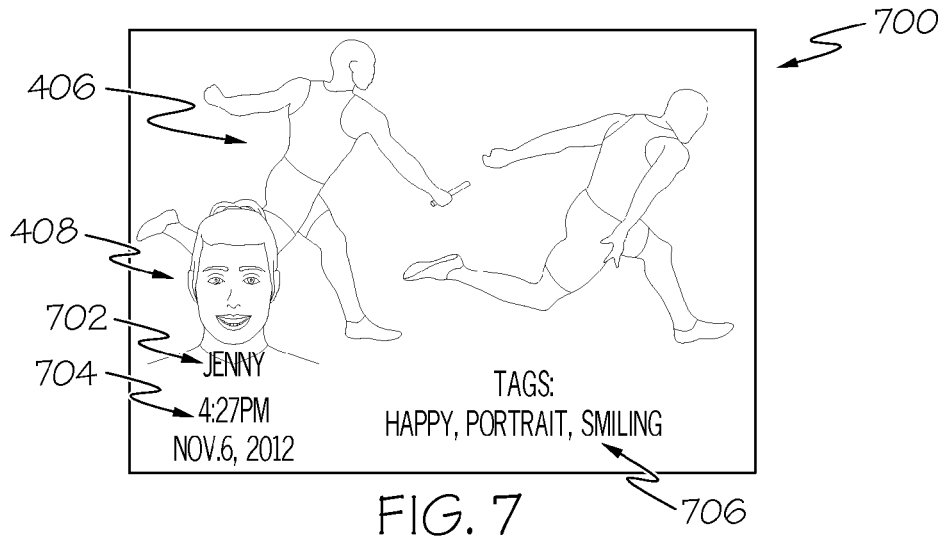

FIG. 4 illustrates a portable electronic device 400 having a rear facing camera 410 taking a rear facing image 408 and a forward facing camera (not shown) taking a forward facing image 406 for display as a composite image 404 on a display or screen 402 of the portable electronic device 400, or a display of another device or processing system. A few additional example embodiments are illustrated in FIGS. 5-7 where the display or screen is shown for such devices. For example, a portable electronic device 500 can include a forward facing image 406 and a rear facing image having visible metadata 502 embedded within the rear facing image and other metadata 504 embedded within the forward facing image. In this particular instance, face recognition analysis of the rear facing image found a match with "Jenny" in a database or list that can be stored locally within the portable electronic device 500 or can be stored and accessible via a network from a remote database or list stored in a server or other remote device. The recognition analysis of the forward facing image enabled the matching of the tags "running, Olympics, and race". Other tags can be recognized, retrieved and stored in association with the images and not necessarily displayed. Further note that the metadata can be embedded in either the rear facing image or the forward facing image or can be embedded in the composite image of the rear facing and forward facing images.

In FIG. 6, a portable electronic device 600 illustrates an instance where the forward facing image 406 is embedded within the rear facing image 408 as a digital watermark. Thus, the recognized rear facing image 408 of the photographer is the more prominent image and the forward facing image 406 can serve as a watermark as part of the composite image. Recognition analysis of the forward facing image can also supply metadata 602 for the forward facing image or composite image. In this example, the recognition analysis provides the information "Handoff at 2012 Olympics". In FIG. 7, a portable electronic device 700 can include a forward facing image 406 and a rear facing image 408 and face recognition information 702 as in FIG. 5 (recognizing Jenny), but can further include a time-stamp 704 of when the image was taken. Facial expression recognition of the rear facing image 408 can be further provided in the form of tags 706. In this case, the recognized picture of "Jenny" taken at "4:27 pm Nov. 6, 2012" further indicates that "Jenny" is likely to be "happy" and "smiling" from her "portrait" picture, perhaps in reaction to her view of the forward facing image 406.

Figure 8:
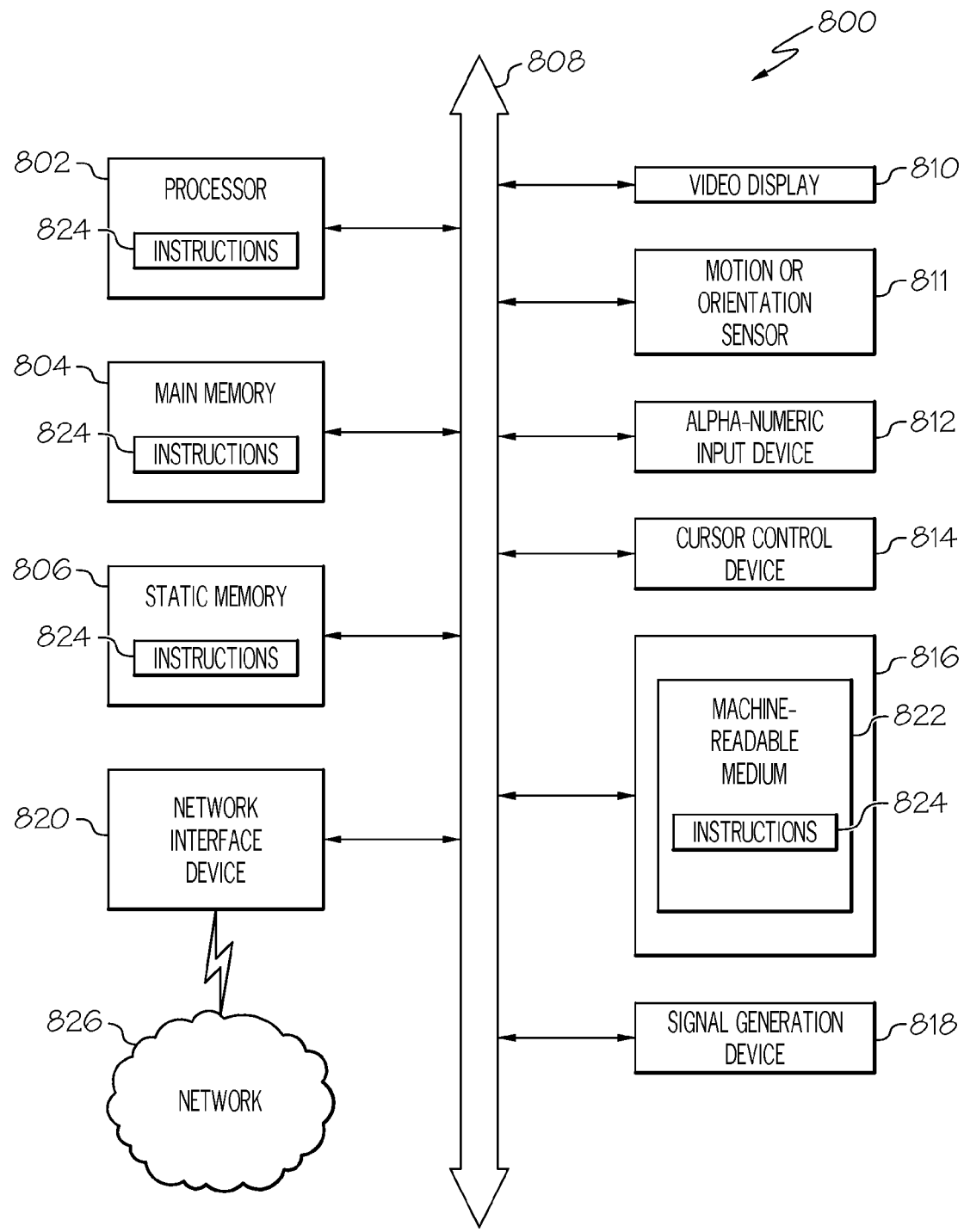
FIG. 8 is a block diagram illustrating a detailed view of a wireless device according to one embodiment of the present invention.

FIG. 8 depicts an example diagrammatic representation of a machine in the form of a computer system 800 within which a set of instructions, when executed, may cause the machine to perform any one or more of the methods discussed above. One or more instances of the machine can operate, for example, as the communication device 100, 200, 400, 500, 600 or 700 as illustrated in FIG. 1, 2, 4, 5, 6 or 7. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may include a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a device herein includes broadly any electronic device that provides image capturing or voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel display, or a solid state display, or a combination). The computer system 800 may include a motion or orientation sensor 811, an input device 812 (e.g., a keyboard), a cursor control device 814 (e.g., a mouse or trackpad), a memory device 816 such as disk drive unit or solid state memory, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute non-transitory tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZIGBEE), and long-range communications (e.g., WiMAX, GSM, CDMA, LTE) are contemplated for use by computer system 800.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one CPU 802 is illustrated for computer 800, computer systems with multiple CPUs can be used equally effectively. Embodiments of the present invention further incorporate interfaces that each includes separate, fully programmed microprocessors that are used to off-load processing from the CPU 802. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system. The network adapter hardware 820 is used to provide an interface to a network 826 as illustrated. Embodiments of the present invention are able to be adapted to work with any data communications connections including present day analog and/or digital techniques or via a future networking mechanism.

Although the illustrative embodiments of the present invention are described in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", or "processing system" describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The term "electronic device" is intended to broadly cover many different types of computing systems and processing systems used by persons. The term "communication device" is intended to broadly cover many different types of electronic devices used by persons, and that can receive signals transmitted from other devices or processing systems, and optionally can transmit signals to other devices or processing systems for reception by the other devices or processing systems, to communicate with other devices or processing systems, and may also operate in a communication system. The terms "wireless device" and "wireless communication device" are intended to broadly cover many different types of communication devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a personal computer, a laptop personal computer, a tablet computer, a personal digital assistant, and other similar communication devices.

The term "portable electronic device" is intended to broadly cover many different types of electronic devices that are portable or that can be transported between locations by a user. For example, and not for any limitation, a portable electronic device can include any one or a combination of the following: a wireless communication device, a laptop personal computer, a notebook computer, a desktop computer, a personal computer, a smart phone, a Personal Digital Assistant, a tablet computer, gaming units, remote controller units, and other handheld electronic devices that can be carried on one's person.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope and spirit of the examples presented or claimed. The disclosed embodiments were chosen and described in order to best explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method, with a portable electronic device, comprising:
contemporaneously obtaining, with the portable electronic device comprising a processor coupled to memory, a forward image from a forward facing camera of the portable electronic device and a rear image comprising an image of a user of the portable electronic device from a rear facing camera of the portable electronic device;
embedding, with the processor of the portable electronic device, one of the rear image in the forward image and the forward image in the rear image, thereby creating a composite image;
performing, with the processor of the portable electronic device and in response to the contemporaneously obtaining the forward image and the rear image, face recognition analysis on the rear image to generate recognition information of the user of the portable electronic device; and,
based on at least the face recognition analysis of the rear image, determining that the user is not an owner of the composite image, and
based on the determining that the user is not an owner of the composite image, storing in a secured location that only an authorized user may access in the memory the recognition information associated with at least one of the forward image and the composite image, and wherein the determining being based on a match failing to exist between the recognition information and an item on an authorized user list of the portable electronic device.

2. The method of claim 1, comprising contemporaneously obtaining, with the processor of the portable electronic device, the forward image from the forward facing camera and the rear image from the rear facing camera in response to a single trigger and storing into the memory the rear image as a watermark within part of the forward image which in combination forms the composite image.

3. The method of claim 1, comprising performing, with the processor of the portable electronic device, steganographically inserting within the composite image secret information derived from the rear image and which is encrypted and imperceptible by human vision.

4. The method of claim 1, comprising performing, with the processor of the portable electronic device, creating metadata in the rear image to identify a photographer.

5. The method of claim 4, comprising performing, with the processor of the portable electronic device, embedding the metadata identifying the photographer within the forward image.

6. The method of claim 4, comprising performing, with the processor of the portable electronic device, embedding the metadata identifying a scene within a forward image within a picture of the photographer in the rear image.

7. The method of claim 1, comprising performing, with the processor of the portable electronic device, contemporaneously obtaining the forward image from the forward facing camera and the rear image from the rear facing camera in response to a single trigger.

8. The method of claim 7, wherein the embedding comprises embedding the rear image as a watermark in the forward image thereby creating the composite image, and comprising performing, with the processor of the portable electronic device, adding a time-stamp to the watermark.

9. The method of claim 1, comprising performing, with the processor of the portable electronic device, face recognition analysis on the rear image to generate recognition information by analyzing expressions on the rear image to determine tags to apply to the composite image.

10. The method of claim 1, comprising performing, with the processor of the portable electronic device, arranging the rear image within the forward image in a manner un-obstructive of an object of the forward image.

11. The method of claim 1, comprising performing, with the processor of the portable electronic device, composing the composite image of the rear image and the forward image in a viewfinder of the portable electronic device.

12. The method of claim 1, comprising performing, with the processor of the portable electronic device, analyzing the forward image with face recognition analysis or object recognition analysis.

* * * * *